(12) United States Patent
Yamanaka (10) Patent No.: US 6,424,436 B1
(45) Date of Patent: Jul. 23, 2002

(54) HOLOGRAPHIC ELEMENT

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/542,867

(22) Filed: Apr. 4, 2000

(30) Foreign Application Priority Data

Apr. 6, 1999 (JP) ............................................ 11-099463

(51) Int. Cl.$^7$ ................................................. G02B 5/32
(52) U.S. Cl. ...................... 359/15; 359/498; 359/576; 359/588; 235/462.01
(58) Field of Search ......................... 359/15, 498, 588, 359/576; 235/462.01

(56) References Cited

U.S. PATENT DOCUMENTS

| | | | | |
|---|---|---|---|---|
| 3,922,068 A | * | 11/1975 | Uetsuki ........................ | 359/588 |
| 5,907,436 A | * | 5/1999 | Perry et al. .................. | 359/576 |
| 6,003,772 A | * | 12/1999 | Dickson et al. ......... | 235/462.01 |

FOREIGN PATENT DOCUMENTS

| | | |
|---|---|---|
| JP | 62-211603 | 9/1987 |
| JP | 2-96103 | 4/1990 |
| JP | 7-5316 | 1/1995 |
| JP | 9-292520 | 11/1997 |

* cited by examiner

Primary Examiner—Audrey Chang
Assistant Examiner—Craig Curtis
(74) Attorney, Agent, or Firm—Young & Thompson (57) ABSTRACT

A holographic element, which can be manufactured without the use of an anisotropic material and comprises a corrugated surface configuration whose grooves and ridges have moderate depth and height corresponding to the pitch of the corrugated surface configuration, is provided together with a method of manufacturing same. The holographic element is for switching light paths in dependence on the polarization directions of an incident light and comprises a plurality of regions formed substantially periodically on a substrate, by which regions the transmitted light has different phase differences between its polarization components as a whole. Within one cycle of the substantially periodically formed regions, at least one of the regions is such a region in which a corrugated configuration of one-dimensional structure with a pitch not greater than the wavelength of the incident light is formed. Each region, in which the corrugated configuration is formed, is coated by a multilayer film composed of a plurality of layers which are made of isotropic materials of different refractive indices and laminated in such a manner that the refractive index in the film varies periodically across a thickness thereof.

23 Claims, 6 Drawing Sheets

FIG. 6 y-DIRECTION (P) POLARIZATION
PHASE OF TRANSMITTED LIGHT

FIG. 7 x-DIRECTION (S) POLARIZATION
PHASE OF TRANSMITTED LIGHT

HOLOGRAPHIC ELEMENT

BACKGROUND OF THE INVENTION

1. Field of the Invention

The present invention relates generally to holographic elements and more particularly to such a holographic element in which a plurality of regions, which include a region developing in dependence on polarization directions of an incident light thereon a phase difference between polarization components of a transmitted light and are different as a whole in the phase difference between the polarization components of the transmitted light, are formed on a substrate substantially periodically to provide different diffraction efficiencies in dependence on polarization components of the incident light.

This application is based on Japanese Patent Application No. Hei 11-99463, the contents of which are incorporated herein by reference.

2. Description of Related Art Including Information Disclosed Under 37 CFR 1.97 and 37 CFR 1.98

Figure 17:
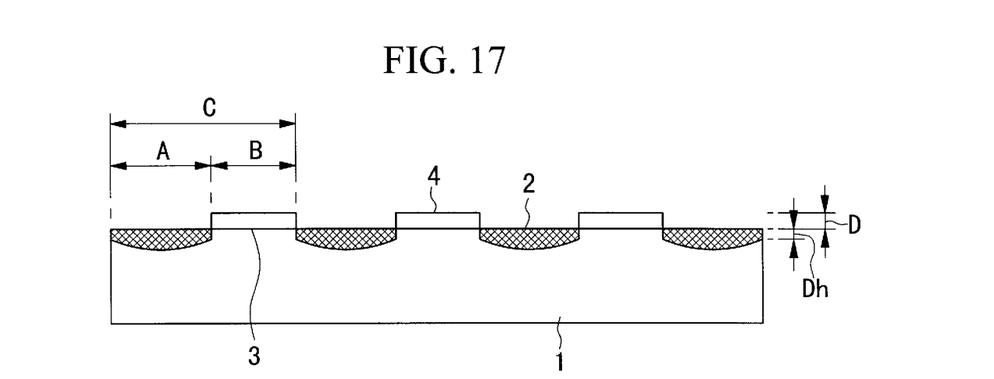
FIG. 17 is a schematic sectional view illustrating the structure of a conventional holographic element which uses a birefringent crystal.

A great number of holographic elements for switching light paths depending upon polarization directions of an incident light have been used in the field of optical communication and optical discs. For example, a wave plate which is formed by laminating plural surface relief type holograms that switch a plane of polarization of an incident light is disclosed in Japanese Unexamined Patent Application, First Publication, No. Sho 62-211603. Furthermore, a diffraction grating type polarizer which is formed by arranging and joining a double refraction material and a second optical material via adhering layers on a first optical material of the polarizer is disclosed in Japanese Unexamined Patent Application, First Publication, No. Hei 9-292520. One conventional holographic element of this kind is shown in FIG. 17. This figure is a crosssectional view of the conventional holographic element which has a polarization dependency and diffracts only a specific polarization component.

This holographic element is constructed, as shown in the FIG. 17, such that strip-like proton exchange regions 2 each extending in a direction perpendicular to the drawing and proton non-exchanged regions 3, which are exposed substrate regions extending along the adjacent proton exchange region 2, are alternately formed in a substrate 1. This substrate is made of lithium niobate which is a birefringent crystal having different refractive indices depending on the polarization directions of an incident light. The proton exchange regions 2 are formed by immersing the lithium niobate substrate 1 whose surface is covered by a mask having openings in an acid containing protons thereby to cause the proton ions and the lithium ions to be exchanged by their mutual diffusion through the openings of the mask. The proton exchange region 2 and the proton non-exchanged region 3 have different birefringent characteristics from each other. These two regions 2 and 3 can produce, for mutually orthogonal polarization components (hereinafter referred to as "P polarization" and "S polarization") of lights vertically incident on the substrate, different phase differences between orthogonal polarization components of the transmitted lights.

A phase adjusting film 4 is formed on each proton non-exchanged region 3. The phase adjusting film 4 is provided for adjusting the phase difference between the regions 2 and 3 to a desired value and is made from an isotropic medium. In FIG. 17, the phase adjusting film 4 is formed only on the proton non-exchanged regions 3, but it may also be formed on either the proton exchange regions 2 or the proton non-exchanged regions 3, or on both the regions 2 and the regions 3.

Figure 6:
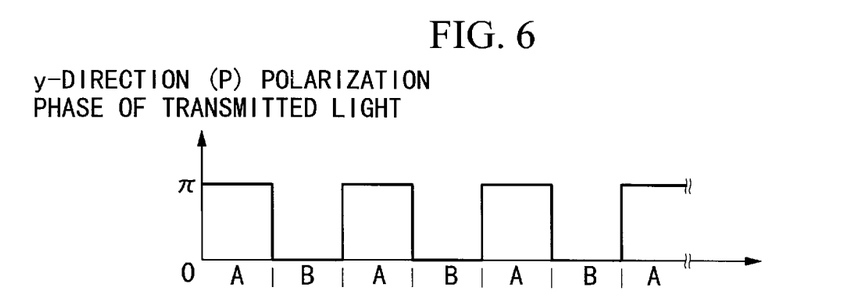
FIG. 6 is a graph showing the change in phase of the y-direction (P) polarization component of the transmitted light of the holographic element shown in FIG. 1.
Figure 7:
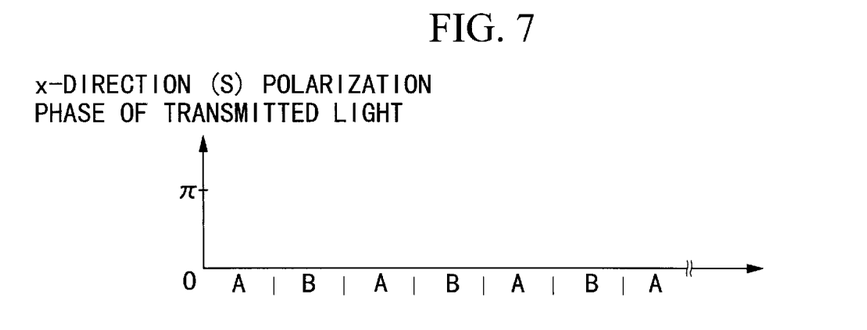
FIG. 7 is a graph showing the change in phase of the x-direction (S) polarization component of the transmitted light of the holographic element shown in FIG. 1.

As shown, for example, in FIGS. 6 and 7, the phase adjustment can be made such that the phase of the transmitted lights in specific regions changes by 180 degrees for the P polarization but that the phase does not change in any regions for the S polarization. A polarization dependent holographic element which selectively diffracts the P polarization component can thus be obtained.

This phase adjustment can be made using parameters given below in addition to the adjustment parameters relating to the phase adjusting film 4 in accordance with the following formulas (1) and (2):

$$Dh \cdot (Nhp - Np) + D \cdot (1 - N) = 2 \cdot n \cdot \lambda + \lambda/2 \tag{1}$$

$$Dh \cdot (Nhs - Ns) + D \cdot (1 - N) = 2 \cdot m \cdot \lambda \tag{2}$$

where m and n are positive integers, Np a P polarization refractive index of the proton non-exchanged region 3 which is a part of the lithium niobate substrate 1, Ns an S polarization refractive index of the proton non-exchanged region 3, Dh a thickness of the proton exchange region 2, Nhp a P polarization refractive index of the proton exchange region 2, Nhs an S polarization refractive index, D a thickness of the phase adjusting film 4 and N a refractive index of the phase adjusting film 4.

The above-described holographic element, however, has a problem that it is rather expensive due to the fact that it requires an expensive birefringent crystal of lithium niobate and a dedicated treatment facility for obtaining the proton exchange regions 2 by means of acid treatment.

Furthermore, a phase adjustment is made using a double refractive film that is formed by the diagonal vapor deposition in a diffraction grating type polarizer, and the double refractive film has a double refractiveness dependent upon a material and substrate. This diffraction grating type polarizer is disclosed in Japanese Unexamined Patent Application, First Publication, No. Hei 7-5316.

To solve this problem, holographic elements which do not employ a birefringent material have been developed. One of conventional holographic elements of such type is disclosed in Japanese Unexamined Patent Application, First Publication, No. Hei 2-96103. The structure of this holographic element is characterized in that a plurality of regions, each having a concavo-convex or a an corrugated surface configuration of a pitch less than a half of the wavelength of an incident light, are formed in a surface of a substrate made of an isotropic medium in such a manner that the directions of pitch of those regions differ from each other. The concavo-convex configurations are obtained by forming grooves in the substrate by means of a photolithographic technique or an etching technique. In a holographic element of this type, the phase adjustment is carried out mainly by adjusting a depth of the grooves. In general, the greater the difference in depth of the grooves between the regions, the greater the phase difference.

The holographic element of the above structure which does not make use of a birefringent material, however, has such a problem that since the grooves must be formed with a depth substantially greater than the pitch of the corrugated configuration in order to obtain a desired phase difference, its productivity is rather low.

BRIEF SUMMARY OF THE INVENTION

It is therefore an object of the present invention to provide a holographic element that can be manufactured without the use of an anisotropic material and comprises recesses and projections of moderate depth and height which correspond to a pitch of the concavo-convex configuration.

To solve the aforesaid problems, according to a first aspect of the present invention, there is provided a holographic element in which a plurality of regions, including a region for developing in response to an incident light thereon a phase difference between polarization components of a transmitted light in dependence on polarization directions of the incident light and having, as a whole, different phase differences between polarization components of the transmitted light, is formed substantially periodically in a substrate to provide different diffraction efficiencies depending upon polarization components of the incident light, wherein at least one of the plurality of regions within one cycle of the substantially periodically formed regions is a region in which a concavo-convex configuration having a one-dimensional periodic structure with a pitch equal to or less than a wavelength of the incident light is formed, and wherein a multitude of layers made of isotropic media having different refractive indices are laminated to form a multilayer film on the region with the concavo-convex configuration in such a manner that a refractive index of the multilayer film varies periodically across a thickness thereof.

As a second aspect of the present invention, the polarization directions may be perpendicular to each other.

As a third aspect of the present invention, in the holographic element, a phase adjustment may be made in such a manner that an amount of change in phase of a polarization component in a specific direction among the polarization components of the transmitted light is constant throughout the plurality of regions.

As a fourth aspect of the present invention, the substrate may be a transparent substrate and in that the region formed with the concavo-convex configuration has such a structure that the multilayer film is laminated on projections and recesses formed in the transparent substrate at a pitch equal to or less than the wavelength of the incident light.

As a fifth aspect of the present invention, in the holographic element, at least one of the regions within one cycle of the substantially periodically formed plurality of regions may be a planar region on which the multiplayer film is deposited.

As a sixth aspect of the present invention, in the holographic element, a phase adjustment may be made within one cycle of the substantially periodically formed plurality of regions by adjusting a thickness of the substrate for each region.

As a seventh aspect of the present invention, in the holographic element, a direction of the substantially periodic formation of the plurality of regions and a direction of pitch of the one-dimensional periodic structure in the region with the concavo-convex configuration may be different from each other.

As a eighth aspect of the present invention, the plurality of regions may include, within one cycle of the substantially periodically formed plurality of regions, a plurality of regions formed respectively with concavo-convex configurations whose one-dimensional periodic structures have mutually different directions of pitch.

As a ninth aspect of the present invention, the holographic element may include, within one cycle of the substantially periodically formed plurality of regions, two or more regions formed respectively with concavo-convex configurations whose one-dimensional periodic structures have directions of pitch which agree with the direction in which the plurality of regions are substantially periodically formed, wherein the pitch of the one-dimensional structures gradually increases or decreases in the direction in which the plurality of regions are substantially periodically formed.

According to a tenth aspect of the present invention, the recesses in the concavo-convex configuration formed in the substrate may be grooves formed in the substrate.

With the structure according to the present invention, at least one region within one cycle of a plurality of regions is selected to be a region in which a concavo-convex configuration having a one-dimensional structure of a pitch not greater than the wavelength of an incident light is formed and a multitude of layers made of isotropic media of different refractive indices are laminated to form a multilayer film on the regions formed with the concavo-convex configurations in such a manner that the refractive index in the multilayer film varies periodically across a thickness thereof, so that it is possible to utilize the thickness and the refractive indices of the layers of the multilayer film as parameters for adjusting a phase difference between the polarization components of the transmitted light.

Thus, as compared to the conventional case where a difference between high and low levels in the concavo-convex configuration can only be used as parameters for the phase adjustment, a variety of parameters is available for such phase adjustment in the present invention, as a result of which a required phase difference can be obtained by a proper magnitude of difference between high and low levels in the concavo-convex configuration. The manufacturing of the holographic element according to the present invention can thus be relatively easy.

DETAILED DESCRIPTION OF THE INVENTION

According to the structure of the present invention, a plurality of regions, including a region for developing in dependence on polarization directions (for example, orthogonal polarization directions) of an incident light a phase difference between polarization components of a transmitted light and having, as a whole, different phase differences between polarization components of the transmitted light, is formed substantially periodically in a surface of a substrate. In addition, at least one of the plurality of regions within one cycle of the substantially periodically formed regions is a region in which a concavo-convex configuration having a one-dimensional periodic structure with a pitch equal to or less than a wavelength of the incident light is formed, and a multitude of layers made of isotropic media having different refractive indices are laminated to form a multilayer film on the region formed with the concavo-convex configuration in such a manner that a refractive index of the multilayer film varies periodically across a thickness thereof.

With this structure, since the layer thickness and the refractive indices in the multilayer film can be used as parameters for adjusting the phase difference between the polarization components of the transmitted light, a variety of parameters for the phase adjustment are available as compared to the conventional case where the depth of the grooves of the concavo-convex configuration was the only parameter for such phase adjustment.

Although it is possible to use as the concavo-convex configuration, for example, such a structure that a multilayer film is deposited on projections and recesses formed in the transparent substrate, in the case where the recesses are grooves formed in the transparent substrate, a required phase difference can be obtained by suitably adjusting the thickness and/or the refractive indices of the multilayer film without making the grooves unreasonably deep with respect to the pitch of the concavo-convex configuration.

In other words, by obtaining a desired phase difference by forming by grooves of a moderate depth corresponding to the pitch in the concavo-convex configuration, a holographic element for switching light paths in dependence on the polarization directions of an incident light can be produced.

In addition, the thickness of the substrate may be adjusted for each region within one cycle of the plurality of regions, which will further diversify parameters for the phase adjustment, as a result of which the degree of freedom of design can be increased.

The direction in which the plurality of regions are formed substantially periodically and the direction of pitch of the one-dimensional periodic structure in the region with the concavo-convex configuration may be different from each other. In this case, the directions in which the polarization dependency is exhibited and the direction of diffraction can be set independently of each other, since the direction of diffraction agrees with the direction of periodic formation of the plurality of regions and since the directions in which the polarization dependency is exhibited are the direction of pitch of the one-dimensional periodic structure in the regions with the concavo-convex configurations and a direction perpendicular to this direction.

It is also possible to make such an arrangement that two or more regions formed respectively with concavo-convex configurations whose one-dimensional periodic structures have directions of pitch which agree with the direction of the periodical formation of the plurality of regions are provided within one cycle of the substantially periodically formed plurality of regions and that the pitch of the one-dimensional structures gradually increases or decreases in the direction in which the plurality of regions are periodically formed. In this case, these regions will develop different amounts of birefringence. More specifically, when a light is vertically incident upon the surface of the substrate of this holographic element, it is possible, by the phase adjustment based on the thickness of the multilayer film and/or the difference in level of the grooves and ridges, to cause only a specific polarization component of the transmitted light to change in phase stepwise. Consequently, it is possible to change the ratio of the intensity of the positive first-order diffracted light to the intensity of the negative first-order diffracted light of the diffraction grating.

By dividing each region in which the pitch of its one-dimensional periodic structure gradually increases or decreases more finely, it is possible to cause the phase distribution of a specific polarization component of the transmitted light to approach a saw-tooth phase distribution. Thus, it is possible to produce only a diffracted light in one direction of the positive and negative first-order diffractions.

Some preferred embodiments of the present invention will now be described with reference to the accompanying drawings.

First Embodiment

Figure 1:
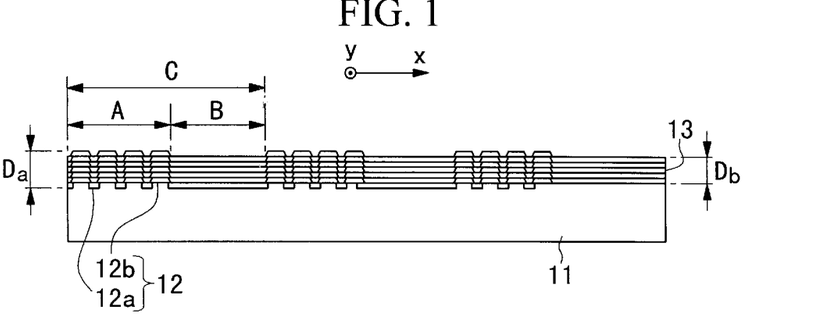
FIG. 1 is a schematic sectional view illustrating the structure of a holographic element provided in accordance with a first embodiment of the present invention.
Figure 2:
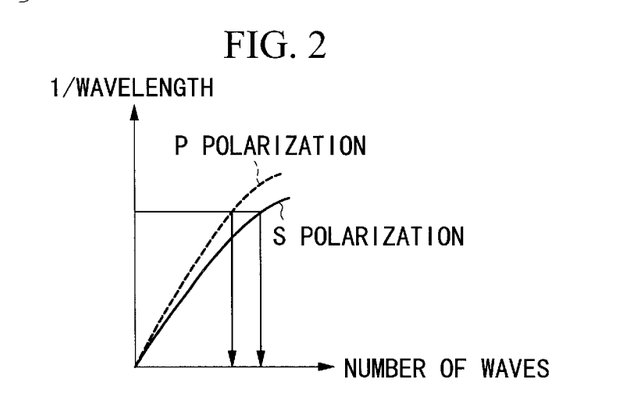
FIG. 2 is a graph showing the relationship between the wavelength of an incident light on a photonic crystal of the holographic element shown in FIG. 1 and the number of waves in the photonic crystal.
Figure 3:
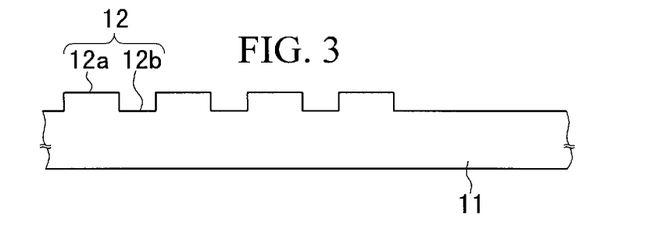
FIG. 3 is a schematic sectional view illustrating manufacturing steps of the holographic elect shown in FIG. 1.
Figure 4:
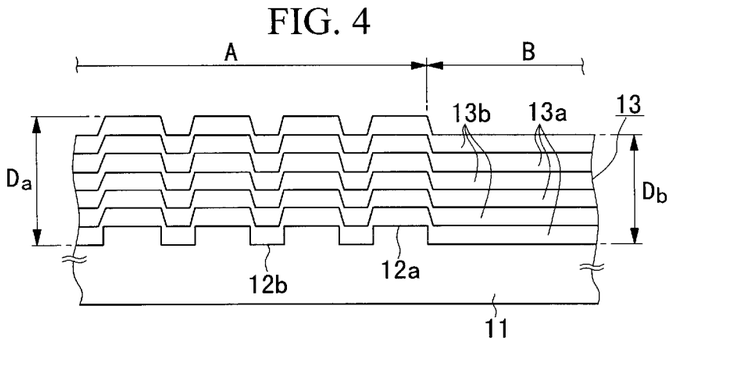
FIG. 4 is a schematic sectional view illustrating manufacturing steps of the holographic element shown in FIG. 1.
Figure 5:
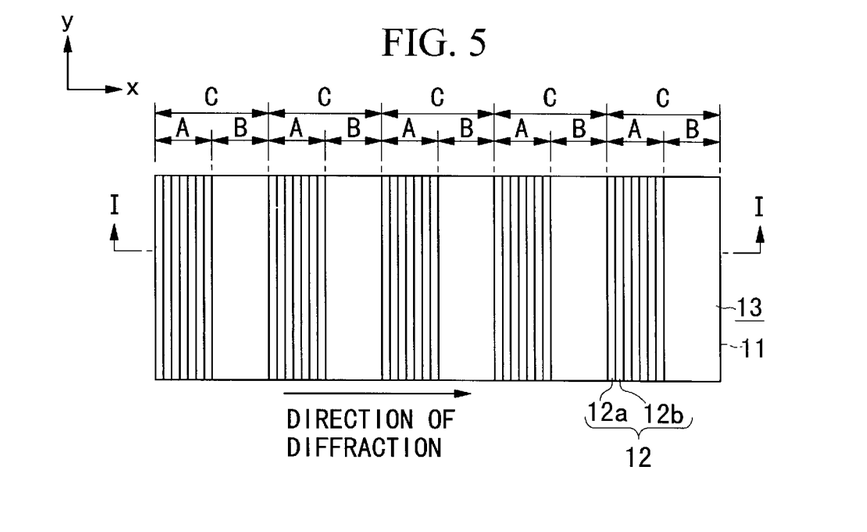
FIG. 5 is a top plan view of the structure of the holographic element shown in FIG. 1.

FIG. 1 is a schematic sectional view illustrating the structure of a holographic element provided in accordance with a first embodiment of the invention, and FIG. 2 is a graph showing the relationship between the wavelength of an incident light on a photonic crystal of the holographic element and the number of waves in the photonic crystal. FIGS. 3 and 4 are schematic sectional views illustrating manufacturing steps of the holographic element. FIG. 5 is a schematic plan view of the holographic element, FIG. 6 a graph showing the change in phase of the y-direction (P) polarization component of the transmitted light of the holographic element and FIG. 7 a graph showing the change in phase of the x-direction (S) polarization component of the transmitted light of the holographic element, wherein the cross-section taken along the line I—I of FIG. 5 corresponds to FIG. 1.

This holographic element employs, instead of a birefringent crystal, a so-called photonic crystal which is made of an isotropic material selected from a variety of dielectric and semiconductor materials and in which a concavo-convex or a corrugated surface configuration having a pitch equal to or less than the wavelength of an incident light is formed to provide a refractive index having an anisotropy equivalent to isotropic material.

As shown in FIG. 1, this holographic element has such a structure that regions A and B are alternately formed, wherein each region A includes a concavo-convex configuration 12 having a one-dimensional periodic structure, which has equivalently a birefringency, on which a film 13 formed of a multitude of layers of different refractive indices is laminated, while each region B only includes the multilayer film 13 laminated on a surface of a planar portion and does not have a birefringency. According to this structure, a phase difference between polarization components can be made different between the region A and the region B in dependence on polarization directions without the use of an expensive birefringent material, whereby a hologram for switching light paths depending upon polarization directions of an incident light can be realized. The concavo-convex configuration having a periodic arrangement in the region A is referred to as "one-dimensional periodic structure" in the sense that its direction of pitch is unity (the x-direction in this case).

More specifically, the regions A in which ridges and grooves of the concavo-convex configuration are periodically formed in the x-direction at a pitch not greater than the wavelength of the incident light and the regions B which is defined by the surfaces of the planar portions disposed at the same level as the bottoms of the grooves of the concavo-convex configuration are formed in the surface of the transparent substrate 11 at a predetermined period in the x-direction. In addition, a multilayer film 13 composed of a plurality of pairs of layers is laminated on the substrate 11 having the concavo-convex configurations 12, wherein two layers 13a and 13b in each pair have different refractive indices so that the refractive index of the multilayer film 13 varies periodically across a thickness of the film. The overall thickness Db of the multilayer film 13 is selected to be small enough to maintain the concavo-convex configurations 12 of the substrate 11. In this case, the height of the region B from the surface of the planar portion is equal to the thickness of the multilayer film 13. In the region A, however, its height Da from the surface of the planar portion is greater than that of the region B by the ridge 12a.

As shown in FIG. 5, the regions A and the regions B are arranged alternately in the x-direction. In the region A, the strip-like grooves 12b and ridges 12a extend in parallel in the y-direction with substantially the same widths and are arranged alternately in the x-direction. The region B comprised of the planar surface has a longitudinal axis extending in the y-direction and a width in the x-direction substantially equal to that of the region A. The adjoining regions A and B constitute one cycle C.

With the above structure, when the pitch or period of the corrugated surface configuration 12 is less than or equal to the wavelength of the incident light, in response to a light vertically incident upon the surface of the substrate 11 the element will not produce any diffracted lights but exhibit a birefringency. In this case, the element has different apparent refractive indices between the cases where the polarization direction of this incident light is parallel with and perpendicular to the grooves 12b. The effective refractive indices in these parallel and perpendicular zones are determined by the ratio of the width of the groove 12b to that of one pitch of the one-dimensional periodic structure and the refractive indices at the ridge 12a and the groove 12b. Thus, the above structure can be treated as an anisotropic medium, and thus according to this structure the diffraction efficiency of the element can be changed in dependence upon the polarization directions by means of its birefringency.

FIG. 2 shows the fact that since the apparent refractive index is different between the orthogonal polarization components (P-polarization and S-polarization), a difference will appear in the number of waves, wherein the ordinate represents the reciprocal of the wavelength of the incident light (1/wavelength) and the abscissa represents the number of waves in the crystal (the reciprocal of the wavelength of the light propagating in the crystal).

In the case where the light is incident upon the surface of the holographic element perpendicularly thereto, a phase difference $\gamma p$ between the regions A and B for the P polarization and a phase difference $\gamma s$ between the regions A and B for the S polarization are given by the following formulas (3) and (4), respectively:

$$\gamma p = Da \cdot Nap - Db \cdot Nb - (Da - Db) \quad (3)$$

$$\gamma s = Da \cdot Nas - Db \cdot Nb - (Da - Db) \quad (4)$$

where Nap is an effective refractive index with respect to the P polarization in the region A, Nas an effective refractive index with respect to the S polarization in the region A, and Nb an equivalent refractive index in the region B (i.e., an average refractive index of the multilayer film 13).

By adjusting the phase-adjusting parameters in accordance with the formulas (3) and (4), such an arrangement can be obtained that the y-direction (P) polarization component advances in phase by 180 degrees ($\pi$ radians) in the regions A without any phase change in the regions B, with the x-direction (S) polarization component exhibiting no phase change both in the regions A and B.

FIG. 6 shows the variation in phase of the transmitted light for the y-direction (P) polarization in the periodic arrangement of the regions A and B, and FIG. 7 shows the variation in phase of the transmitted light for the x-direction (S) polarization. According to this difference in the phase difference, the diffraction efficiency for the y-direction (P) polarization can be rendered high, while the diffraction efficiency for the x-direction (S) polarization can be rendered low.

As described above, this holographic element has, as a whole, a function as a diffraction grating having equivalent anisotropy such that the y-direction (P) polarization component of the orthogonal polarization components of the incident light can selectively be diffracted.

A method of manufacturing the above holographic element will now be described with reference to FIGS. 3 and 4.

First, a photoresist film (not shown) is formed on the substrate 11 made of a dielectric or a semiconductor material as shown in FIG. 3. Then, a pattern is formed in the photoresist film by means, for example, of the well-known holographic interference exposing method which is suitable for forming a fine pattern. Subsequently, the substrate 11 is subjected to a dry etching with the photoresist film formed with the pattern being used as a mask, whereby the grooves 12b, each having a width less than or equal to a half of the wavelength of a light to be incident upon the finished holographic element, are formed in the substrate 11 at a pitch less than or equal to the wavelength of the light. In this case, the width of the ridge 12a formed between the adjoining grooves 12b is selected to be substantially equal to that of the groove 12b. By the foregoing a photonic crystal is constructed.

Subsequently, the layers 13a and 13b different in refractive index from each other are successively formed on the substrate 11 by means, for example, of the sputtering method which is suitable for forming a thin film. In this case, amorphous silicon and SiO2 are used as materials for forming these layers and the layers 13a (or 13b) of the same refractive index are formed every two layers. Each of the two layers 13a and 13b within one cycle has a thickness on the order of 0.2 μm. The manufacturing of the holographic element according to the first embodiment of the invention has thus been completed.

As described above, in the holographic element of this structure, the regions A in which a phase difference develops between the orthogonal polarization components (P polarization and S polarization) of the transmitted light depending upon the polarization direction of the incident light and the regions B in which no such phase difference develops are formed substantially periodically in the surface of the substrate 11, and the multilayer film 13 covering the surface of the substrate 11 and having the layers of different refractive indices is formed with such a layer arrangement that the refractive index changes periodically across the thickness of the film. As a result, the layer thickness and the refractive indices in the multilayer film 13 can be used as parameters for adjusting the phase difference between the orthogonal polarization components of the transmitted light, so that a variety of parameters for the phase adjustment are now available as compared to the conventional case where the depth of the grooves of the concavo-convex configuration was the only parameter for such phase adjustment.

Therefore, when use is made of such a structure that the surface of the transparent substrate 11, in which the grooves 12b are formed periodically for the concavo-convex configuration 12, is covered by the multilayer film 13, by suitably adjusting the layer thickness and the refractive indices in the multilayer film 13, a required phase difference can be obtained by forming the grooves 12b of a moderate depth corresponding to the pitch of the corrugated surface configuration 12. Thus, the manufacturing of this holographic element is easier.

Second Embodiment

Figure 8:
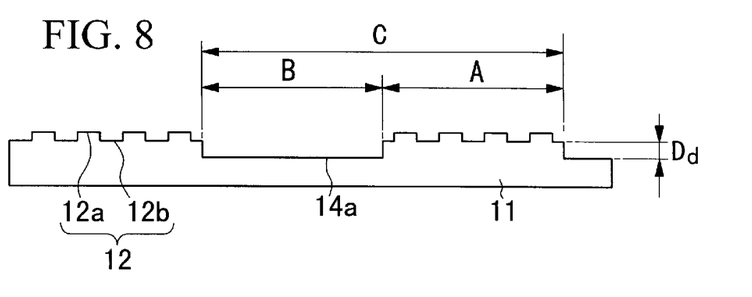
FIG. 8 is a schematic sectional view illustrating the structure of a substrate used for a holographic element made in accordance with a second embodiment of the present invention.
Figure 9:
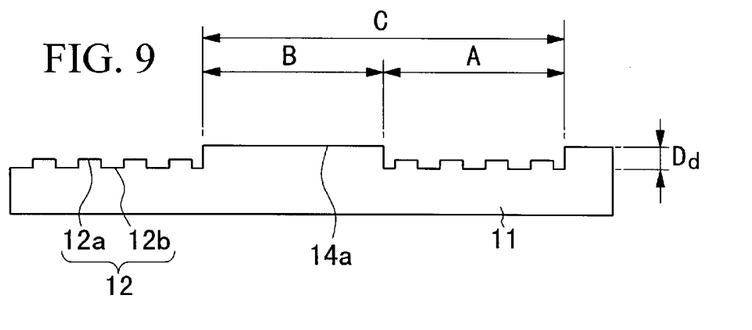
FIG. 9 is a schematic sectional view illustrating another structure of the substrate used for the holographic element according to the second embodiment of the present invention.

FIGS. 8 and 9 are schematic sectional views illustrating the structure of a holographic element provided in accordance with a second embodiment of the invention. In FIGS. 5 and 6, the multilayer film 13 is omitted and only the transparent substrate 11 is shown.

This holographic element according to this embodiment is significantly different from that according to the first embodiment in that the substrate 11 is made different in thickness between the region A and the region B within one cycle (the region C). In these figures, the parts of this holographic element which are identical to those shown in FIG. 1 are designated by the same reference characters and their description will be omitted.

In the above-described first embodiment in which the phase difference is determined in accordance with the formulas (3) and (4), since the difference between Da and Db is small in practice, the degree of freedom of design is small, so that it is difficult in certain cases to obtain a desired phase difference only by the optimisation of the concavo-convex configuration. In such cases, it is advantageous first of all to render the substrate 11 thinner or thicker in the region B than in the region A as shown in FIGS. 8 and 9, respectively, so that the substrate 11 is different in thickness between the regions A and B. In FIG. 8, 14a represents the thinner region of the substrate 11, while in FIG. 9, 14b represents the thicker region of the substrate 11. Since this difference is a relative matter, it is equally possible to render the substrate 11 thicker or thinner in the region A than in the region B.

When a light is vertically incident upon the surface of the above holographic element, an inter-regional phase difference $\gamma p$ for the P polarization and an inter-regional phase difference $\gamma s$ for the S polarization can be expressed by the following formulas:

$$\gamma p = Da \cdot Nap - Db \cdot Nb - (Da - Db) + Dd \cdot (Ns - 1) \quad (5)$$

$$\gamma s = Da \cdot Nas - Db \cdot Nb - (Da - Db) + Dd \cdot (Ns - 1) \quad (6)$$

where Dd represents a difference in thickness of the substrate 11 between the regions A and B (Da–Db, where Da≧Db), and Ns represents a refractive index of the substrate 11.

Thus, according to this second embodiment, parameters for the phase adjustment can further be diversified by adjusting the thickness of the substrate 11 at the regions A and B within one cycle (the region C), whereby the degree of freedom of design can further be increased.

Third Embodiment

Figure 10:
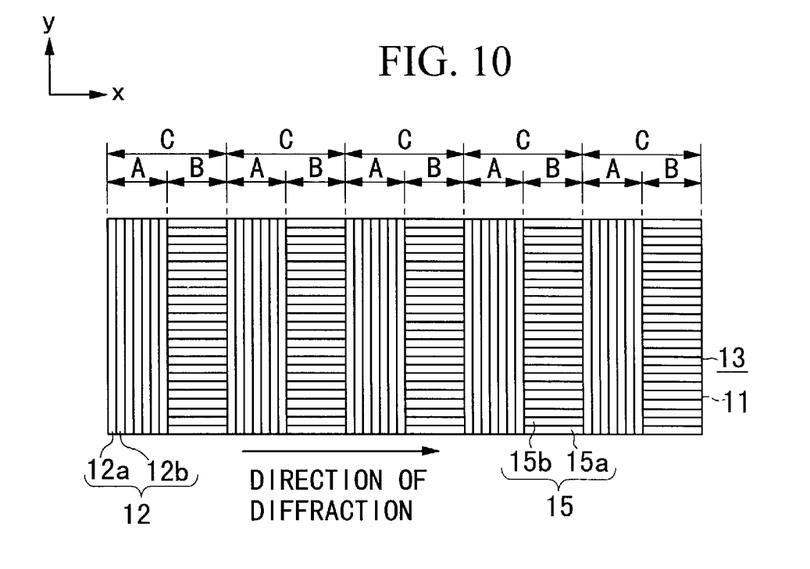
FIG. 10 is a schematic plan view illustrating the structure of a holographic element provided in accordance with a third embodiment of the present invention.

FIG. 10 is a plan view illustrating the structure of a holographic element provided in accordance with a third embodiment of the present invention.

The holographic element according to this embodiment is different from that according to the first embodiment in that, in addition to the concavo-convex configuration (or corrugated surface configuration) 12 formed in each region A, the substrate 11 has another concavo-convex configuration (or a corrugated surface configuration) 15 formed in each region B as shown in FIG. 10, wherein the directions of pitch of the respective one-dimensional periodic structures in the regions A and B are different and perpendicular to each other. In FIG. 10, the constituent parts of this holographic element which are identical to those shown in FIG. 5 are designated by the same reference characters and their description will be omitted.

According to the holographic element of this structure, since the concavo-convex configurations (slotted surface configurations) are formed in different directions in the regions A and B, the difference in characteristic due to the polarization can be made larger between the different regions, so that it is possible to render the thickness of this element in the direction of thickness of the layers (or the difference between high and low levels) smaller than in FIG. 1. Thus, the processing of the substrate 11 will be easier.

Fourth Embodiment

Figure 11:
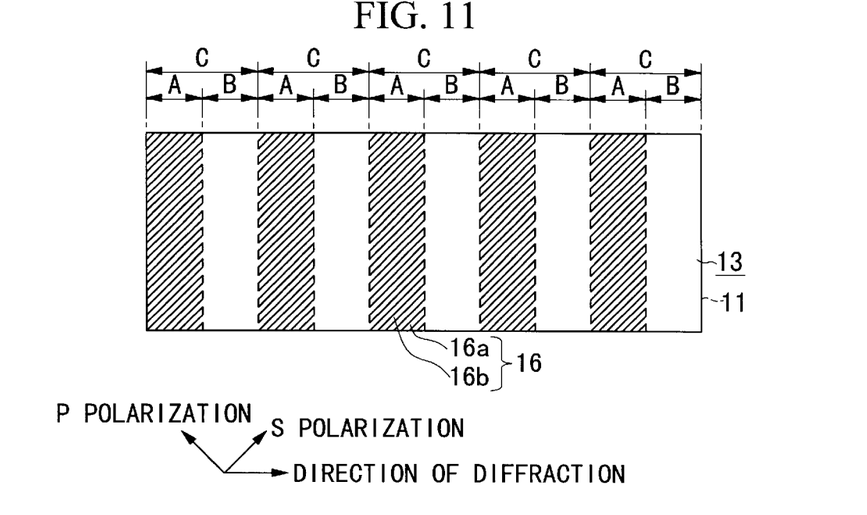
FIG. 11 is a schematic plan view illustrating the structure of a holographic element provided in accordance with a fourth embodiment of the present invention.

FIG. 11 is a plan view illustrating the structure of a holographic element provided in accordance with a fourth embodiment of the present invention.

The holographic element according to this embodiment is different from that according to the first embodiment in that the direction in which the regions A, each having a substantially periodically concavo-convex configuration 16, and the regions B are periodically formed, and the direction of pitch of the onedimensional periodic structure or the concavo-convex configuration 16 formed in each region A are different from each other.

As shown in FIG. 11, the strip-like ridges and grooves of the concavo-convex configuration 16 in the region A have their axes directed upper-rightward in this figure. Therefore, the directions in which the polarization dependency is exhibited are the longitudinal direction of the ridge or groove of the concavo-convex configurations 16 and a direction perpendicular to this longitudinal direction. In this case, the direction of pitch of the one-dimensional structure is oriented upper leftward in the figure. On the other hand, the direction of diffraction agrees with the direction of periodic formation of the regions A, in which the substantially periodically concavo-convex configurations 16 are formed, and the regions B. Thus, by making the direction of periodic formation of the regions A and B different from the direction of pitch of the one-dimensional periodic structure of the concavo-convex configuration 16 in the region A, the direction in which the polarization dependency is exhibited and the direction of diffraction can be set independently of each other.

According to the holographic element of this structure, when a light is incident thereon in such a manner that the P polarization component of the orthogonal polarization components of the incident light is parallel to the axis of the groove or ridge in the concavo-convex configuration 16, the effective refractive indices in the parallel zone and the perpendicular zone with respect to a specific polarization direction are determined by the ratio of the width of the groove 16b to one pitch of the one-dimensional periodic structure and the refractive indices at the ridge 16a and the groove 16b, as in the first embodiment.

Therefore, the above structure can be treated as an anisotropic medium, so that the diffraction efficiency can be varied in dependence on the polarization directions by making use of its birefringency. With this structure, it is thus possible to manufacture a holographic element for switching light paths depending upon the polarization direction of an incident light.

It is also possible to obtain a desired phase difference by the formation of the grooves 16b of a moderate depth corresponding to the pitch in the concavo-convex configuration 16, by suitably adjusting the thickness and/or the refractive indices of the multilayer film 13 as in the first embodiment, and/or by adjusting the thickness of the substrate at the regions A and B as in the second embodiment.

Fifth Embodiment

Figure 12:
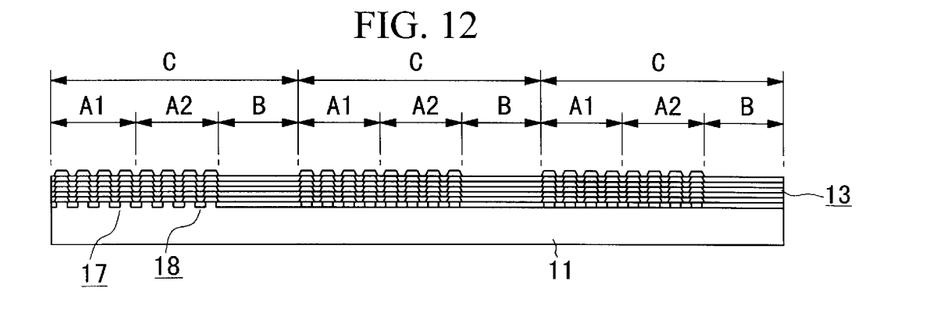
FIG. 12 is a schematic sectional view of the structure of the holographic element provided in accordance with a fifth embodiment of the present invention.
Figure 13:
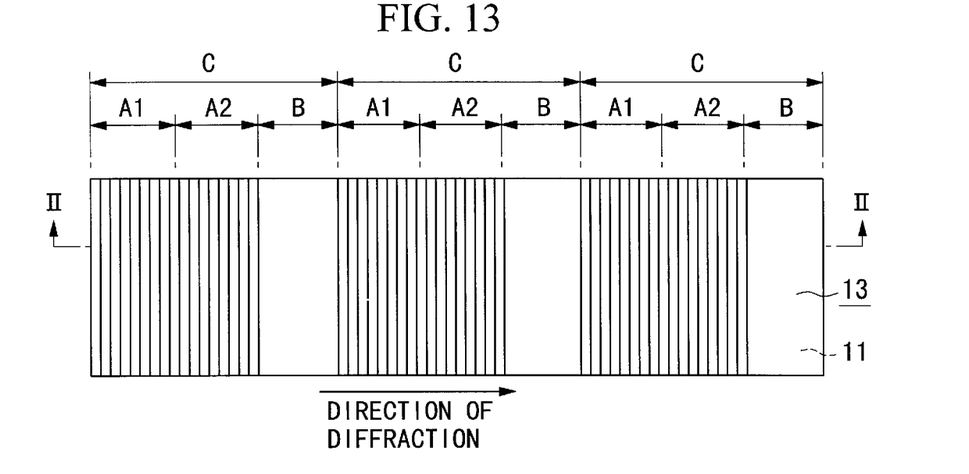
FIG. 13 is a plan view of the structure of the holographic element shown in FIG. 12.
Figure 14:
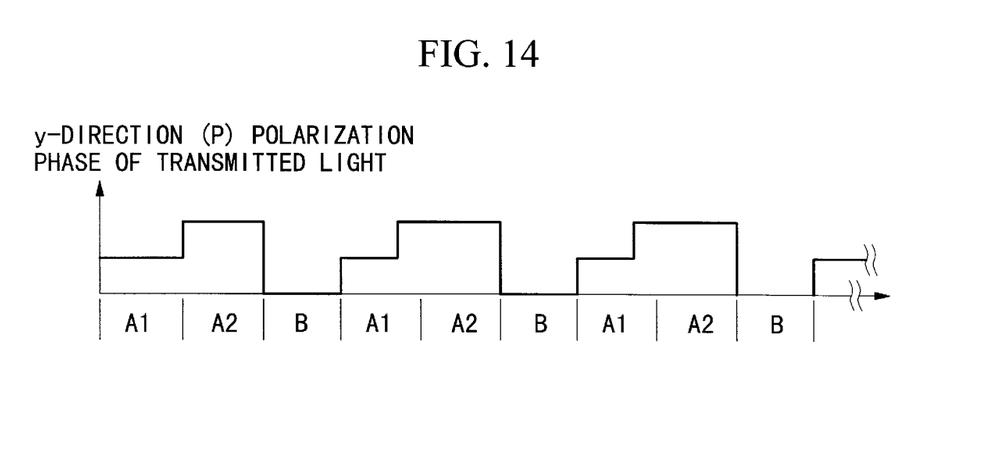
FIG. 14 is a graph showing the change in phase of the y-direction (P) polarization component of the transmitted light of the holographic element shown in FIG. 12.

FIG. 12 is a schematic sectional view of a holographic element provided in accordance with a fifth embodiment of the invention, FIG. 13 a plan view of the holographic element, and FIG. 14 a graph showing the change in phase of the y-direction (P) polarization component of the transmitted light in response to an incident light on the holographic element of the structure of FIG. 12. The cross-section taken along the line II—II of FIG. 13 corresponds to the showing of FIG. 14.

The holographic element according to this embodiment is different from that according to the first embodiment firstly in that three successive regions A1, A2, and B, which constitute one cycle (or a region C), are formed substantially periodically. Secondly, the regions A1 and A2 are formed respectively with concavo-convex configurations 17 and 18, each of which is covered by a multilayer film 13 and has a respective one-dimensional structure of a pitch not greater than the wavelength of an incident light, and the region B is a region of the substrate 11 which has a flat surface disposed at the same level as the bottoms of the grooves in the concavo-convex configurations 17 and 18 and covered by the multilayer film 13 as shown in FIGS. 12, 13, and 14. Lastly, the direction of pitch in the one-dimensional periodic structures of the concavo-convex configurations 17 and 18 in the regions A1 and A2 is the same as the direction in which the regions C are formed periodically, and the pitches in the one-dimensional structures increase, within each cycle (or each region C) composed of the three regions A1, A2, and B, in accordance with the order of the arrangement of these structures in the direction of the periodical formation of the regions C.

With the above structure, although the regions A and B are formed with similar one-dimensional periodic structures in the form of the corrugated surface configurations 17 and 18 with pitches equal to or less than the wavelength of an incident light, these pitches are different from each other, so that the regions A and B will develop different amounts of birefringence. More specifically, when a light is vertically incident upon the substrate 11 of this holographic element, it is possible, by the phase adjustment based on the thickness and/or the refractive indices of the multilayer film 13, and/or the difference in level of the grooves and ridges, to cause only the y-direction (P) polarization component to change in phase of the transmitted light stepwise as shown in FIG. 14. In this case, it is so arranged that the x-direction (S) polarization component does not exhibit any change in phase in all the regions A1, A2, and b.

This structure in which the stepwise phase distribution is formed has such an advantage that it is possible to change the ratio of the intensity of the positive first-order diffracted light to the intensity of the negative first-order diffracted light of the diffraction grating. Consequently, according to this structure, substantially the same advantageous effects as in the first embodiment can be obtained. In addition, quantities of light in two directions can be made unbalanced, so that this holographic element is suitable for use, for example, in an optical system for an optical head.

Sixth Embodiment

Figure 15:
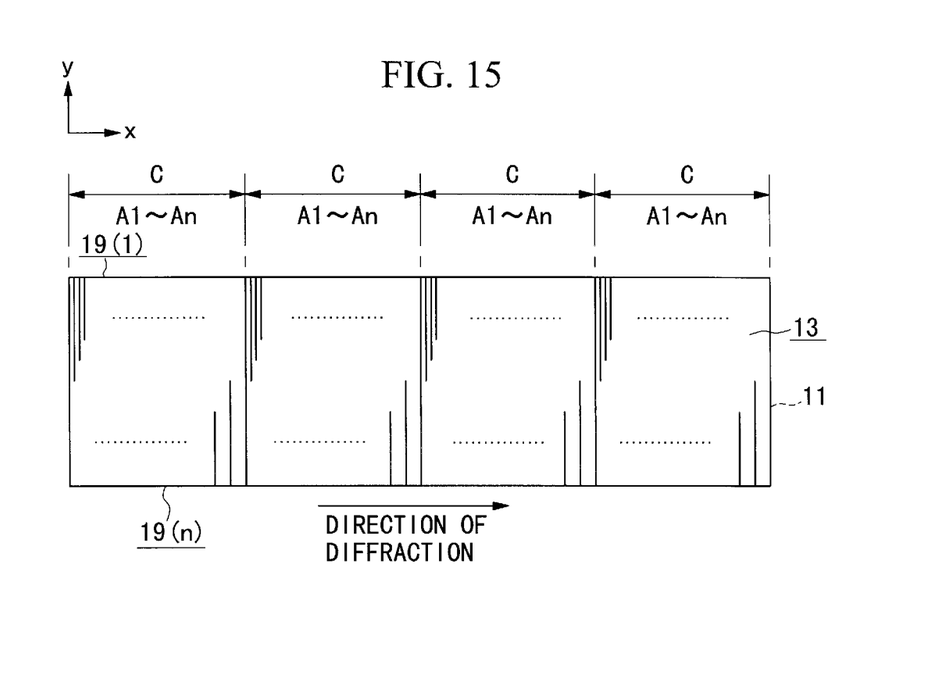
FIG. 15 is a schematic plan view of the holographic element provided in accordance with a sixth embodiment of the present invention.
Figure 16:
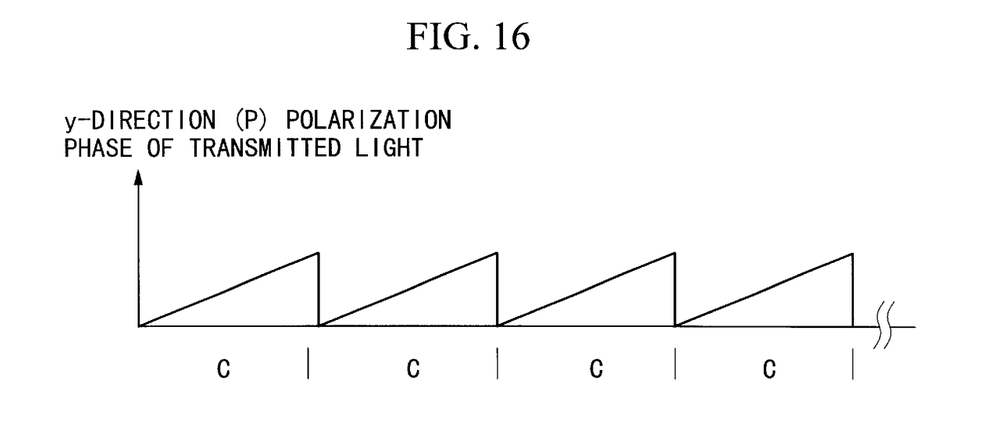
FIG. 16 is a graph showing the change in phase of the y-direction (P) polarization component of the transmitted light of the holographic element shown in FIG. 15.

FIG. 15 is a plan view illustrating the structure of a holographic element provided in accordance with a sixth embodiment of the invention, and FIG. 16 is a graph showing the change in phase of a transmitted light of the y-direction (P) polarization component in response to an incident light on the holographic element having the structure shown in FIG. 15.

The holographic element of this structure differs from that according to the fifth embodiment firstly in that it does not comprise any region formed with a flat surface but comprises only regions A1 to An which are formed substantially periodically. Secondly, each cycle (or each region C) is divided significantly finely into the regions A1 to An as compared to the fifth embodiment. On the other hand, this holographic element is similar to the holographic element according to the fifth embodiment in that the direction of pitch in the one-dimensional periodic structures of the concavo-convex configurations 19(1) to 19(n) in the regions A1 to An within one cycle thereof is the same as the direction in which the regions C are periodically formed and in that the pitches in the one-dimensional structures gradually increase, within each cycle of the regions A1 to An, in accordance with the order of these structures in the direction of the periodical formation of the regions C.

With this asymmetrical structure, since each cycle (or each region C) is divided more finely into the regions A1 to An as compared to the fifth embodiment, it is possible by the phase adjustment to turn the phase distribution of the transmitted light of the y-direction (P) polarization component into a saw,tooth phase distribution, as shown in FIG. 16. In this case, it is so arranged that the x-direction (S)

polarization component does not exhibit any change in phase in all the regions A1 to An. Thus, it is possible to produce diffracted lights of the positive and negative first-order diffractions only in one direction.

Thus, according to this embodiment substantially the same effects as those described in the first embodiment can be obtained. In addition, as compared to the case of the rectangular phase grating where diffracted lights are produced in two directions, according to this type of asymmetric grating the diffraction of light is made in one direction, so that the efficiency of utilization of the light can be increased.

Although description has thus been made of several embodiments of the present invention, it should be understood that the present invention is not limited to these embodiments and that any modifications and changes made thereto without departing from the scope and spirit of the invention are also included in this invention.

For example, although the surface of the substrate 11 in the region B shown in FIGS. 1, 3, and 4 is a flat surface disposed at the same level as the bottom of the groove 12b in the region A, it may also be a flat surface disposed at the same level as the top of the ridge 12a in the region A.

Furthermore, although the pitches in the corrugated surface configurations 17 and 18 in the regions A1 and A2 are changed to obtain the step-like phase distribution in the fifth embodiment, the same effect can also be obtained by changing the difference between the high and low levels in the corrugated surface configurations 17 and 18, and/or the width of the groove and/or the ridge.

Furthermore, although the pitch of the one-dimensional periodic structures in the regions with the concavo-convex configuration increases, in FIGS. 12 to 16, in accordance with the order of arrangement of the regions with the concavo-convex configuration in the direction of periodic formation of the plurality of regions (in the rightward direction in these figures), the pitch of the one-dimensional periodic structures can alternatively decrease.

Also, although the diffraction gratings in the above embodiments employ one-dimensional periodic structure, they can alternatively employ a holographic pattern of the two-dimensional structure which has conventionally been used. In that case, the concavo-convex configurations is formed in the substrate along the region of the holographic pattern.

What is claimed is:

1. A holographic element comprising:
 a plurality of regions—including a region for developing, in response to an incident light thereon, a phase difference between polarization components of a transmitted light as a function of polarization directions of the incident light—that are arranged substantially periodically in a substrate to provide different diffraction efficiencies depending upon polarization components of the incident light,
 wherein at least one of the plurality of regions within one cycle of the substantially periodical regions is a region having parallel concavo-convex configurations having a one-dimensional periodic structure with a pitch equal to or less than a wavelength of the incident light, and
 wherein a multitude of layers made of isotropic media having different refractive indices are laminated to form a multilayer film on the region formed with the concavo-convex configurations in such a manner that a refractive index of the multilayer film varies periodically across a thickness thereof.

2. A holographic element according to claim 1, wherein the polarization directions are perpendicular to each other.

3. A holographic element according to claim 1, wherein a phase adjustment is made in such a manner that an amount of change in phase of a polarization component in a specific direction among the polarization components of the transmitted light is constant throughout the plurality of regions.

4. A holographic element according to claim 1, wherein the substrate is a transparent substrate and wherein the region formed with the concavo-convex configuration has such a structure that the multilayer film is laminated on projections and recesses formed in the transparent substrate at a pitch equal to or less than the wavelength of the incident light.

5. A holographic element according to claim 1, wherein at least one of the regions within one cycle of the substantially periodically formed plurality of regions is a planar region on which the multiplayer film is laminated.

6. A holographic element according to claim 1, wherein a phase adjustment is made within one cycle of the substantially periodically formed plurality of regions by adjusting a thickness of the substrate for each region.

7. A holographic element according to claim 1, wherein a direction of the substantially periodic formation of the plurality of regions and a direction of pitch of the one-dimensional periodic structure in the region with the concavo-convex configuration are different from each other.

8. A holographic element according to claim 1, wherein the plurality of regions include, within one cycle of the substantially periodically formed plurality of regions, a plurality of regions formed respectively with concavo-convex configurations whose one-dimensional periodic structures have mutually different directions of pitch.

9. A holographic element according to claim 1 including, within one cycle of the substantially periodically formed plurality of regions, two or more regions formed respectively with concavo-convex configurations whose one-dimensional periodic structures have directions of pitch which agree to the direction in which the plurality of regions are substantially periodically formed, wherein the pitch of the one-dimensional structures gradually increases or decreases in the direction in which the plurality of regions are substantially periodically formed.

10. A holographic element according to claim 1, wherein recesses in the concavo-convex configuration formed in the substrate are grooves formed in the substrate.

11. A holographic optical switch, comprising:
 a transparent substrate having plural alternating first and second regions that are parallel and extend longitudinally in a first direction;
 plural grooves in a surface of said substrate in each of said first regions, said plural grooves being parallel and extending longitudinally in said first direction, the surface of said substrate being free of said grooves in each of said second regions; and
 a plurality of pairs of layers on said substrate over said plural alternating first and second regions, each of said pairs of layers having two layers that have different refractive indices, said plurality of pairs of layers over said first regions replicating said plural grooves.

12. The switch of claim 11, wherein said first regions of said substrate have a thickness that is different from a thickness of said second regions of said substrate.

13. The switch of claim 11, wherein said first regions have a width, measured in a second direction perpendicular to said first direction, that is different from a width of said second regions.

14. The switch of claim 11, wherein each of said first regions comprises plural subregions, and wherein said plural grooves have different groove-to-groove distances in each of said plural subregions.

15. A holographic optical switch, comprising:

a transparent substrate having plural alternating first and second regions that are parallel and extend longitudinally in a first direction;

plural grooves in a surface of said substrate in each of said first and second regions, said plural grooves in said first regions being parallel and extending longitudinally in said first direction, said plural grooves in said second regions being parallel and extending transversely to said first direction; and a plurality of pairs of layers on said substrate over said plural alternating first and second regions, each of said pairs of layers having two layers that have different refractive indices, said plurality of pairs of layers over said first and second regions replicating said plural grooves.

16. The switch of claim 15, wherein said first regions of said substrate have a thickness that is different from a thickness of said second regions of said substrate.

17. The switch of claim 15, wherein said first regions have a width, measured in a second direction perpendicular to said first direction, that is different from a width of said second regions.

18. The switch of claim 15, wherein each of said first regions comprises plural subregions, and wherein said plural grooves have different groove-to-groove distances in each of said plural subregions.

19. A holographic optical switch, comprising:

a transparent substrate having plural alternating first and second regions that are parallel and extend longitudinally in a first direction;

plural grooves in a surface of said substrate in each of said first regions, said plural grooves being parallel and extending transversely to said first direction, the surface of said substrate being free of said grooves in each of said second regions; and a plurality of pairs of layers on said substrate over said plural alternating first and second regions, each of said pairs of layers having two layers that have different refractive indices, said plurality of pairs of layers over said first regions replicating said plural grooves.

20. The switch of claim 19, wherein said first regions of said substrate have a thickness that is different from a thickness of said second regions of said substrate.

21. The switch of claim 19, wherein said first regions have a width, measured in a second direction perpendicular to said first direction, that is different from a width of said second regions.

22. A holographic optical switch, comprising:

a transparent substrate having plural regions that are parallel and extend longitudinally in a first direction;

plural grooves in a surface of said substrate in each of said regions, said plural grooves being parallel and extending longitudinally in said first direction, said plural grooves in each of said regions being spaced apart by distances that vary across said region; and a plurality of pairs of layers on said substrate over said plural regions, each of said pairs of layers having two layers that have different refractive indices, said plurality of pairs of layers replicating said plural grooves.

23. The switch of claim 22, wherein said plural grooves are spaced apart by distances that increase step-wise from one longitudinal edge of said region to an opposite longitudinal edge of said region.

* * * * *